Dec. 8, 1931.  W. L. PIPES  1,835,669
TIRE SHAPING APPARATUS
Filed Feb. 12, 1931  2 Sheets-Sheet 1
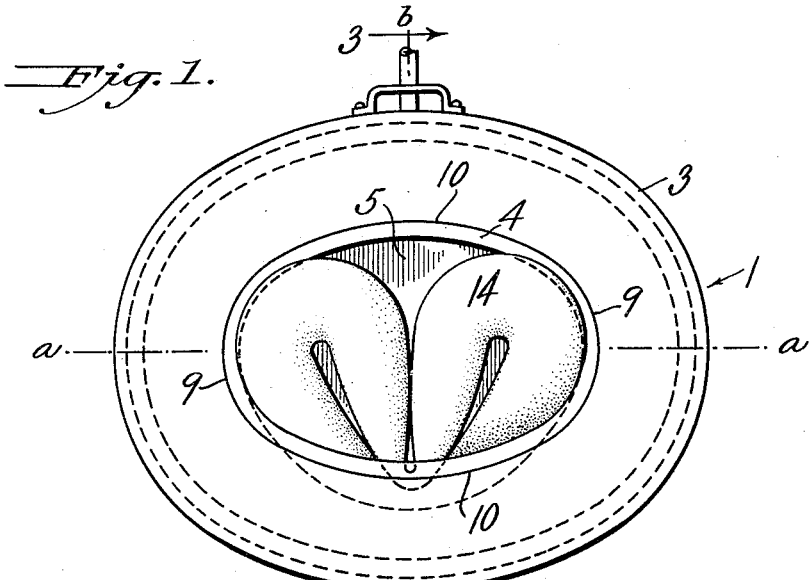
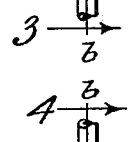
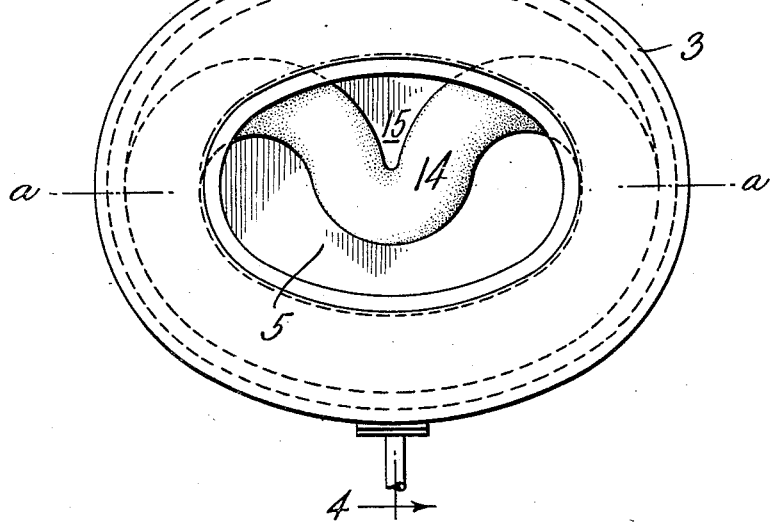
INVENTOR Dec. 8, 1931.  W. L. PIPES  1,835,669
TIRE SHAPING APPARATUS
Filed Feb. 12, 1931  2 Sheets-Sheet 2

INVENTOR
Walter L. Pipes

Patented Dec. 8, 1931

1,835,669

UNITED STATES PATENT OFFICE

WALTER L. PIPES, OF ELIZABETH, NEW JERSEY, ASSIGNOR TO MORGAN & WRIGHT, OF DETROIT, MICHIGAN, A CORPORATION OF MICHIGAN

TIRE SHAPING APPARATUS

Application filed February 12, 1931. Serial No. 515,311.

My invention relates to tire shaping apparatus and more particularly to apparatus for shaping tires from flat built or "pulley" bands by the application of differential fluid pressure.

In the manufacture of rubber tires, a method now in common use comprises the building of the tread, plies and beads as an endless or "pulley" band on a flat or substantially flat drum. The band is removed from the drum and placed in an apparatus for shaping it to the annular tire shape by the application of differential pressure. The shaping may be performed by applying a condition of vacuum to the outer surface of the tire to draw it into a shaping device. The tire may also be shaped by applying pressure in excess of atmospheric pressure to the interior of the band to force it into a shaping device. The shaping operation is usually accompanied by the insertion of a curing bag into the shaped tire.

The curing bags are filled with fluid under pressure when the tire is being vulcanized to force the tire into engagement with the mold surfaces. The tread and other configurations are impressed during the vulcanizing operation. The curing bags are made of rubber and have thick walls for withstanding the pressures to which they are subjected. By reason of the thick walls of the bags they offer considerable resistance to a collapsing operation prior to insertion in the shaping device. In the medium sized bags the efforts of a relatively strong man are required to collapse them so that they may be inserted within the beads of the tire while in the shaping device. The shape of the tire and the openings in the shaping devices have heretofore been circular.

When the collapsed curing bags have been brought into the shaping device they are released and tend to return to their annular shapes thereby nesting in the tires. However, difficulty is often encountered due to a sticking or refusal of the entire bags to return to their annular conditions. This sticking usually occurs at the apices of those portions of the bags which are formed into reentrant angles during the collapsing operation. It is sometimes necessary to hammer these portions of the bags into their final nesting positions in the tires thereby interrupting the normal operations of an operator. The foregoing condition is especially true where the vacuum type of shaping apparatus is used and the collapsed curing bags are inserted through an unobstructed circular opening at the top of the device.

I provide a shaping apparatus of a generally elliptical form, that is with axes of different dimensions intersecting each other at substantially right angles at the center of the shaping device. The remote ends are curved. The curved portions are connected by side walls of different radii of curvature, which may even be straight lines. By the use of an elliptical opening for the insertion of a curing bag, it is not necessary to compress or double up the bag to as great an extent as is necessary where a circular opening is provided.

The outline of the tire beads is defined by the general shape of the opening in the shaping device. When the curing bag is inserted, the apex of the reentrant portion is brought opposite a portion of the side walls having a relatively large radius of curvature, so that the angle at the apex of the reentrant portion, during the latter part of its seating operation, is greater than where the curing bag is conforming to a circular shape. Accordingly, there is less resistance offered to the final nesting of the curing bag where the bag expands against a side wall of an elliptical opening than with the circular opening now in general use.

The accompanying drawings illustrate a present preferred embodiment of the invention, in which Fig. 1 is a diagrammatic plan view of a shaping device embodying my invention, showing the first step in the insertion of a curing bag;

Fig. 2 is a similar view showing a later step in the insertion of a curing bag;

Figure 3:
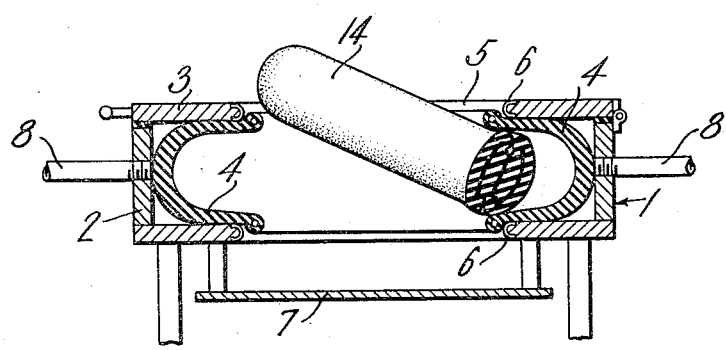
Fig. 3 is a transverse sectional view taken substantially along the section line 3—3 of Fig. 1.
Figure 4:
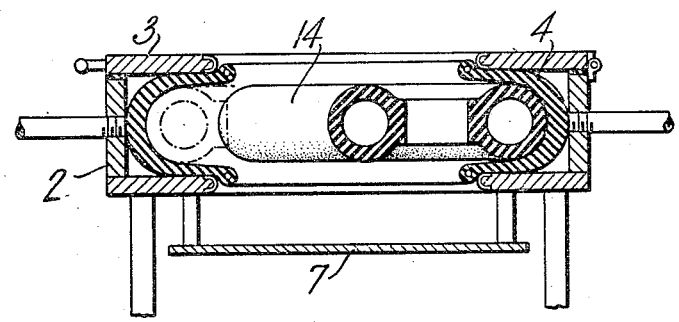
Fig. 4 is a transverse sectional view taken along the section line 4—4 of Fig. 2.

Referring to the drawings, I provide a tire shaping device 1 of general elliptical outline. The device comprises a body 2 and a cover 3 which defines a chamber for shaping a tire 4. An opening 5 is provided at the center of the body 2 and cover 3 for the reception of the tire 4 when it is in the form of an endless band. Sealing rings 6 may be provided around the edges of the openings 5 for insuring a seal with the tire 4. A platform 7 is carried by the body 2 for supporting and positioning the pulley band with its center at substantially the horizontal center line of the shaping device when the tire is inserted. Pipe lines 8 are provided for creating a vacuous condition in the chamber defined by the tire 4, the body 2 and the cover 3 so that upon the application of differential pressure between the inner and outer surfaces of the tire it changes its shape from the flat band, shown in dotted lines in Fig. 4, to the annular shape shown in full lines in Figs. 3 and 4.

As shown in Figs. 1 and 2, the openings 5 are of elliptical shape having a major axis on the center line $a$—$a$ and a minor axis on the line $b$—$b$. The axes intersect each other at substantially right angles at the center of the opening. It is understood that the mathematical value of these axes may be varied considerably, although I have illustrated them in substantially the ratio of 3 to 2. The openings comprises end portions 9 of substantially uniform curvature and side wall portions 10 which may be straight but are preferably curved on a larger radius about as shown. All such constructions, in which the apparatus for applying differential fluid pressure to the opposite faces of an endless band in which the parts that engage the band and govern its shaping are of greater length in one direction than in a direction at right angles thereof, are intended to be described and comprehended by the term "elliptical shape" when used in reference thereto.

Referring to the drawings, after the endless band has been brought to the approximate tire shape as indicated at 4, and while so held in this shape, it has then introduced into it a bag 14 variously termed an air bag, curing bag, or a vulcanizing bag. Such bags are made of vulcanized rubber composition and of a wall thickness relatively heavy as illustrated. They are, particularly in the larger sizes, difficult to fold or buckle to an extent at least taxing the strength of even a powerful man. Of course the labor involved in folding or buckling such a bag is proportionate to the size of the tire casing being manufactured.

With the differential pressure shaping apparatus of my invention and referring to such as of the vacuum box type illustrated, by having the opening in the vacuum box of a greater length in one direction than in a direction at right angles thereto, it is possible to introduce the bag, which has been folded or buckled to the approximate tire form, into the casing with greater ease. The reason for this, obviously, is that the bag does not need to be buckled and folded upon itself so compactly in order to get it past the top wall of the vacuum chamber and the beads of the casing which has been shaped in the vacuum box, as in the case of a shaping box having a circular opening. Once the outer periphery of the bag has been brought in contact with the casing at one point, for instance at the bottom of Figure 2 of the drawings, it is comparatively easy to start the unfolding of the bag. It may be unfolded to a position more nearly approaching its normal annular form as shown in full lines in Figure 2 of the drawings, than when inserted in a circular shaping box. Thereafter, as will also be apparent from viewing Figure 2 of the drawings, it is comparatively easy to unbuckle the re-entrance angle indicated at 15 and complete the nesting of the bag within the casing. No substantial damage is done to the casing by shaping the endless bands to approximate tire form in cross section in a vacuum box which is of elliptical form because the shaping operation is almost momentary, taking only a second or two of time. A greater part of the time the casing is held in the elliptical shape is taken up in nesting the bag within the casing to maintain it in tire form after it is removed from the differential pressure shaping apparatus. As the operation of nesting the bag within the casing is expedited by the elliptical shape resorted to there is no deleterious effect upon the casing by reason of its bulging to approximate tire form in cross section in a shaping apparatus of the elliptical form illustrated.

It will thus be seen that by this invention there is an economy in labor, in effort, and in time by the use of the apparatus of this invention. The only caution that needs to be exercised is to not have the curvature at the ends of the major axis so small that the bead wires, in the case of straight side casings, are too sharply bent.

While I have shown and described my invention with particular reference to a vacuum shaping device, it is to be understood that the use of an elliptical shaping device operating by the application of superatmospheric pressure on the interior of the tire band, as well as the use of openings of varying shapes and dimensions are contemplated within the spirit of the invention and the scope of the accompanying claims.

Having thus described my invention, what I claim and desire to protect by Letters Patent is:

1. In tire shaping apparatus, an elliptical shaping box.

2. In tire shaping apparatus a shaping device having a substantially elliptical outline and a cross-section of substantially U-shape.

3. In tire shaping apparatus, a tire shaping device having an opening for the reception and shaping of a "pulley band" tire, said opening having axes of different dimensions.

4. In tire shaping apparatus, a tire shaping device having an opening for the reception and shaping of a "pulley band" tire, said opening having a major and a minor axis.

5. In tire shaping apparatus, a tire shaping device having an opening for the reception and shaping of a "pulley band" tire, said opening being of substantially elliptical shape.

6. In tire shaping apparatus, a shaping device having an elliptical opening for the reception of a "pulley band" tire and being open at its inner surface for imparting a substantially U-shape to said tire.

7. In tire shaping apparatus, a shaping device having an elliptical opening for the reception of a "pulley band" tire and being open at its inner surface for imparting a substantially U-shape to said tire, and means for causing said tire to change from the "pulley band" shape to a substantially U-shape in cross section.

8. In tire shaping apparatus, a shaping device having an elliptical opening for the reception of a "pulley band" tire and being open at its inner surface for imparting a substantially U-shape to said tire, and means for applying differential pressure to the opposite surfaces of said "pulley band" tire to cause it to conform to the shape of said device.

9. In tire shaping apparatus, a shaping device having an elliptical opening for the reception of a "pulley band" tire and being open at its inner surface for imparting a substantially U-shape to said tire, and means for creating a vacuous condition in said device to cause the tire to substantially conform to the shape of said device.

10. In tire shaping apparatus, a vacuum box having an elliptical opening for the reception of a "pulley band" tire and a curing bag, and means for creating a vacuous condition in said box for causing said tire to substantially conform to the shape of said box.

11. In tire shaping apparatus, a tire shaping device having an opening for the reception and the shaping of a "pulley band" tire, said opening being formed by curved end portions of the device and connecting side wall portions of different shapes than the end portions.

12. Apparatus for shaping endless bands into approximately tire form comprising means for applying differential fluid pressure, said means being of greater length in one direction than in a direction at right angles to the first mentioned direction, whereby endless bands of assembled tire constituents may be bulged out into approximately tire form in cross section while their bead portions are held in approximately elliptical form.

Signed at New York, county of New York, State of New York, this 9th day of February, 1931.

WALTER L. PIPES.